United States Patent [19]

Berthoud et al.

[11] Patent Number: 5,910,976
[45] Date of Patent: Jun. 8, 1999

[54] METHOD AND APPARATUS FOR TESTING CUSTOMER PREMISES EQUIPMENT ALERT SIGNAL DETECTORS TO DETERMINE TALKOFF AND TALKDOWN ERROR RATES

[75] Inventors: Charles William Berthoud, Nazareth; James A. Johnanson, Emmaus, both of Pa.

[73] Assignee: Lucent Technologies Inc., Murray Hill, N.J.

[21] Appl. No.: 08/904,783

[22] Filed: Aug. 1, 1997

[51] Int. Cl.$^6$ ........................................................ H04M 1/24
[52] U.S. Cl. .......................... 379/27; 379/1; 379/201; 379/215; 379/252; 379/373; 379/374
[58] Field of Search ................................ 379/373, 374, 379/386, 1, 6, 22, 27, 29, 372, 142, 21, 23–24, 31, 251–252, 257, 215, 201

[56] References Cited

U.S. PATENT DOCUMENTS 4,764,949  8/1988  Faith et al. ................................. 379/22
5,519,774  5/1996  Battista et al. ........................... 379/386
5,799,060  8/1998  Kennedy et al. ......................... 379/21
5,828,728  10/1998  Hoy et al. .................................. 379/21

Primary Examiner—Curtis A. Kuntz
Assistant Examiner—Duc Nguyen
Attorney, Agent, or Firm—Darby & Darby

[57] ABSTRACT

A method and apparatus for testing a customer premises equipment (CPE) alert signal detector used to detect the start of a Caller ID data transmission using test CPE alert signals generated by a testing platform and mixed with a voice signal as an input to the detector. The testing platform also generates a special sync signal which is input to control circuitry connected to the CPE alert signal detector. An active sync signal indicates when a valid CPE alert signal should be detected. The control circuitry is configured to execute a test algorithm that monitors both the sync signal and the output of the detector and indicates when the CPE alert signal detector has validly detected a CPE alert signal, falsely detected a CPE alert signal, or failed to detect a CPE alert signal. The number of valid, false, and missed CPE alert signal detections are totaled and can be used to calculate the talkoff and talkdown error rates for the detector.

16 Claims, 3 Drawing Sheets

METHOD AND APPARATUS FOR TESTING CUSTOMER PREMISES EQUIPMENT ALERT SIGNAL DETECTORS TO DETERMINE TALKOFF AND TALKDOWN ERROR RATES

TECHNICAL FIELD

This invention is related to a method and apparatus for testing a customer premises equipment alert signal tone detector used for Caller ID applications. More particularly, this invention relates to a method and apparatus for concurrently determining the talkoff and talkdown error rates for a customer premises equipment alert signal tone detector.

BACKGROUND OF THE INVENTION

Caller ID (CID) is a service which provides the identification of the subscriber line from which a telephone call originates. CID information typically includes the telephone number and area code of the calling party and the time and date of the call. Other information, such as a name associated with the identified telephone number may also be supplied.

There are two different conditions during which caller ID information can be sent to a telephone. These are designated as Type I and Type II Caller ID. In Type I, the dialed telephone is not in use and is in the on-hook state. The CID data is sent as an encoded signal between the first and second rings. In Type II Caller ID, also known as Caller ID with Call Waiting, the dialed telephone is in use and normal voice conversation is interrupted to send the CID data.

FIG. 1 is a block diagram illustrating the relationship between the called and calling telephones, also known as near end and far end customer premises equipment (CPE), and a third-party caller. A telephone call is initiated at the far end CPE. The call is processed by the telephone company's Stored Program Control Switching System (SPCS) and connected to the near end CPE. If the SPCS is configured to provide Type I Caller ID services, the Caller ID data about the far end CPE will be sent by the SPCS to the near end CPE during the interval between the first and second rings.

Once a connection is established between the far end and near end CPE, a Type II Caller ID service providing CID data about third party callers can be provided in conjunction with Call Waiting. The sequence of steps involved in a Type II Caller ID transaction is illustrated in FIG. 2. When a third party call to the near end CPE is detected by the SPCS, audio from the far end CPE is muted and the SPCS sends the near end CPE a Subscriber Alerting Signal (SAS), an audio cue for the listener that indicates a call waiting. Following the SAS signal, the SPCS generates a CPE Alert Signal (CAS) to be used by the near end CPE control circuitry. The CAS signal is a dual tone signal nominally at 2130 Hz and 2750 Hz and is approximately 80 ms in length.

Once the CAS detector in the near end CPE detects the CAS, circuitry in the near end CPE mutes the microphone input signal and generates a dual tone Acknowledge signal (ACK) with a DTMF generator. After the ACK is detected by the SPCS, encoded Caller ID data is sent using frequency shift keyed (FSK) modem tones. Once the FSK data is sent, the SPCS unmutes the far end CPE and the near end CPE microphone is unmuted by its own control circuitry.

In a conventional CPE, the CAS detector and DTMF generator are incorporated into a digital signal processor (DSP). The output signal from the CAS detector is used by the DSP to initiate reception of CID. The DSP typically controls a variety of other telephone features besides Caller ID and contains control circuitry, program and data storage areas, input and output ports, as well as other modules related to audio signal processing.

A major obstacle to designing a reliable CAS detector is the fact that the CAS signal must be detected while speech occurs at the near end CPE. Human speech contains the same audio spectrum as a valid CAS tone. A reliable CAS detector must therefore be sensitive to parameters including the frequency of the two tones in the CAS, the twist of the signal (the strength of one tone relative to the other), the overall level of the CAS signal, and the duration of the signal.

Reliability of a CAS detector is indicated as talkdown and talkoff error rates. A talkdown error is a missed CAS signal in the presence of speech. Talkdown provides a measure of how well the CAS detector is able to detect the alerting signal even with the presence of voice. In normal operation, a talkdown error results only from the near end speech since the far end speech is muted by the SPCS during the near end CPE alerting sequence. A talkoff error results when the CAS detector detects a false CAS from normal speech. This is a serious problem since the false CAS will cause the CPE to mute the transmit path of the microphone and interrupt the conversation. It is critical that the CPE have a robust detector that is not easily triggered by speech. Therefore, the CPE's CAS detector must be rigorously tested to ensure that it operates within acceptable parameters. One procedure for testing a CPE's CAS detector is outlined in the Bellcore document SR-TSV-002476.

Conventional methods of testing a CAS detector involve sending speech alone to the CPE and counting the number of false detects to determine the talkoff error rate. The talkdown error rate is determined by generating a test CAS tone, mixing it with speech to generate an audio test signal which is sent to the CPE, and then counting the number of missed detects. Testing of this type is very time consuming, often taking from 400 to 1,200 hours for a complete test run. Thus, it is advantageous for the talkoff and talkdown tests to be run concurrently.

A significant limitation in conventional testing methods is due to reliance on the dual tone ACK signal to assess the operation of the CAS detector. The ACK signal can be compromised both by problems in the CPE and in the DTMF detector of the testing platform itself. If an ACK signal is missed, an otherwise successful CAS detection may not be recorded. Similarly, erroneous ACK detections may be counted as false CAS detections by the CPE. The results of conventional testing methods are therefore colored by errors introduced by the talkoff and talkdown performance of the DTMF detector in the testing platform.

SUMMARY OF THE INVENTION

The present invention provides a method and apparatus for testing an alert signal detector using test alert signals. In a preferred embodiment, the alert signal detector is a CAS detector incorporated within a digital signal processor used in various customer premesis equipment. According to the present invention, test CAS tones are intermittently generated by a testing platform, mixed with an audio signal, and sent to the appropriate audio input in the DSP that contains the CAS detector being tested. The testing platform also generates a SYNC pulse which indicates a time interval during which a valid CAS signal sent to the DSP should be detected. The DSP is configured to receive the SYNC input signal and programmed to compare received SYNC pulses with received CAS detections from the CAS tone detector.

When one or both of a SYNC pulse and a CAS detect is received by the DSP control circuitry, the DSP will use a CAS detector test algorithm and internal logic to determine whether the CAS detector has validly detected a CAS, falsely detected a CAS, or failed to detect a CAS. The results of this comparison are indicated on a DSP output signal connected to the testing platform. The number of valid, false, and missed CAS detections are totaled and used to calculate talkoff and talkdown error rates.

According to the present invention, a CPE's CAS detector is tested without relying on the detection of an ACK signal to assess the detection of the test CAS tones. For this reason, the results of this testing method are not compromised by errors due to false or missed detections of the ACK signal, and therefore are significantly more reliable than conventional testing methods. Additionally, this method advantageously allows both the talkoff and talkdown rates to be determined concurrently, significantly reducing the time required for a complete test run.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENT

Figure 1:
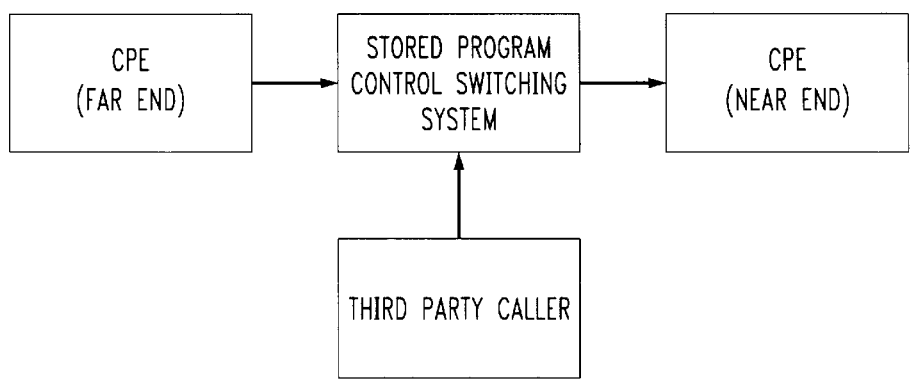
FIG. 1 is a block diagram illustrating the relationship between near and far end CPE's and a third-party caller.
Figure 5:
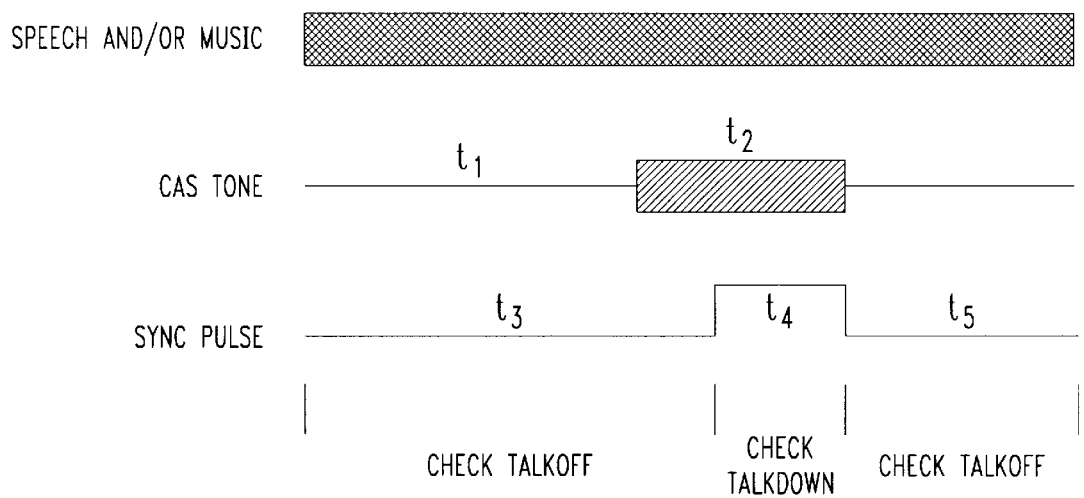
FIG. 5 is a timing diagram showing the relationship between an audio signal, a generated CAS tone, and a SYNC pulse according to the present invention.
Figure 2:
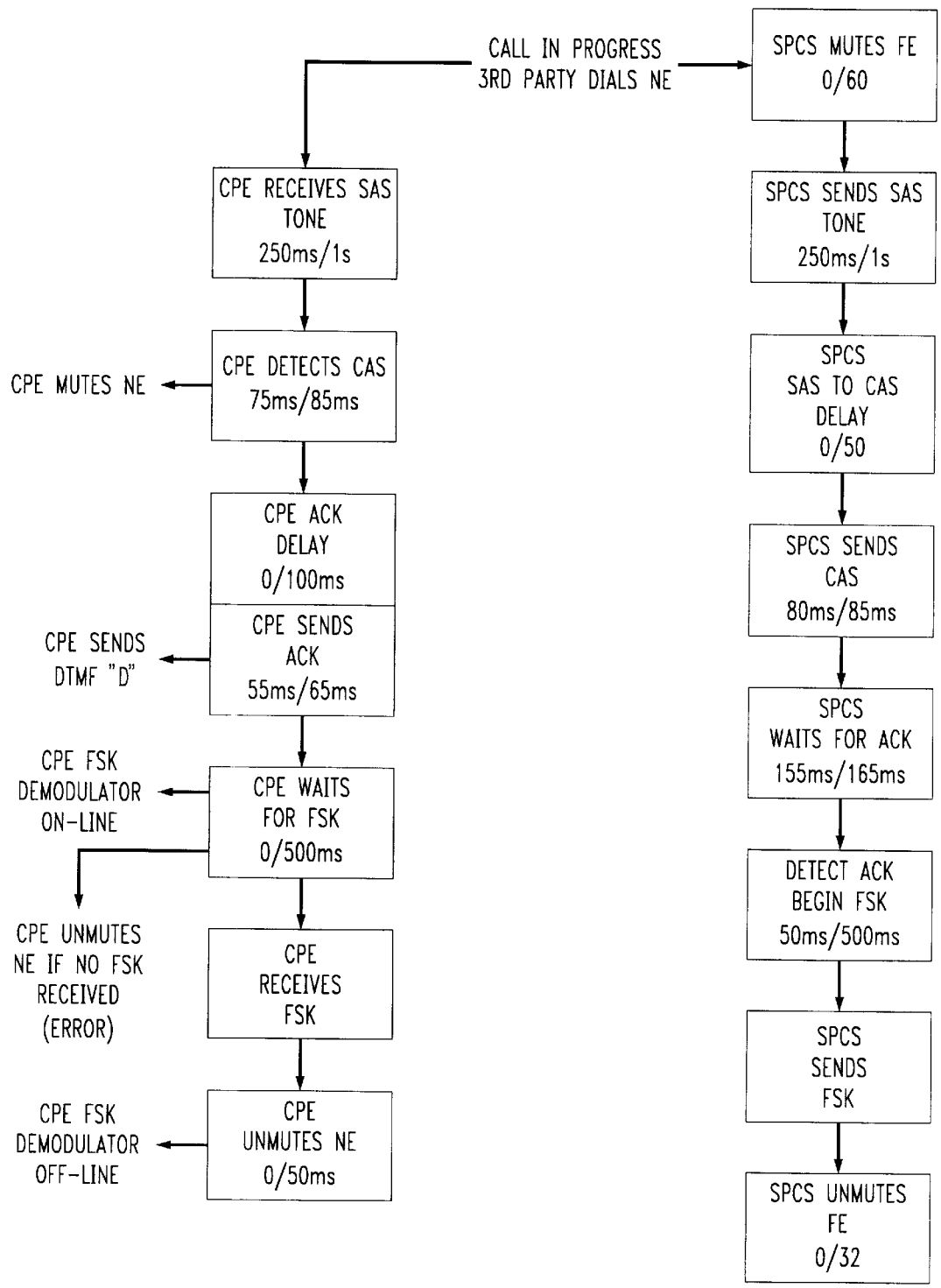
FIG. 2 illustrates the sequence of steps involved iii a Type II Caller ID transaction.
Figure 3:
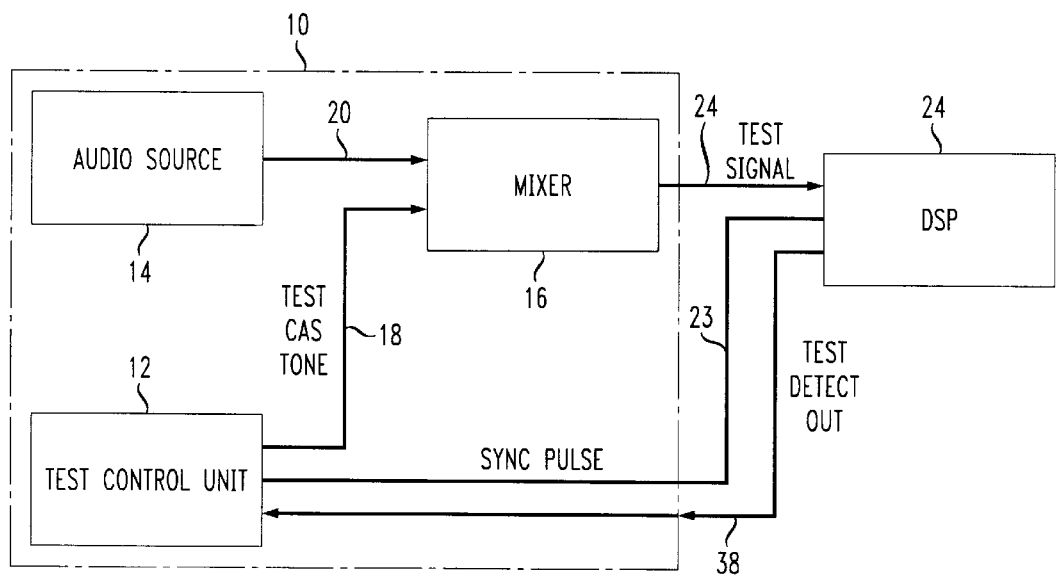
FIG. 3 is a block diagram of a testing platform and DSP connected and configured according to the present invention.
Figure 4:
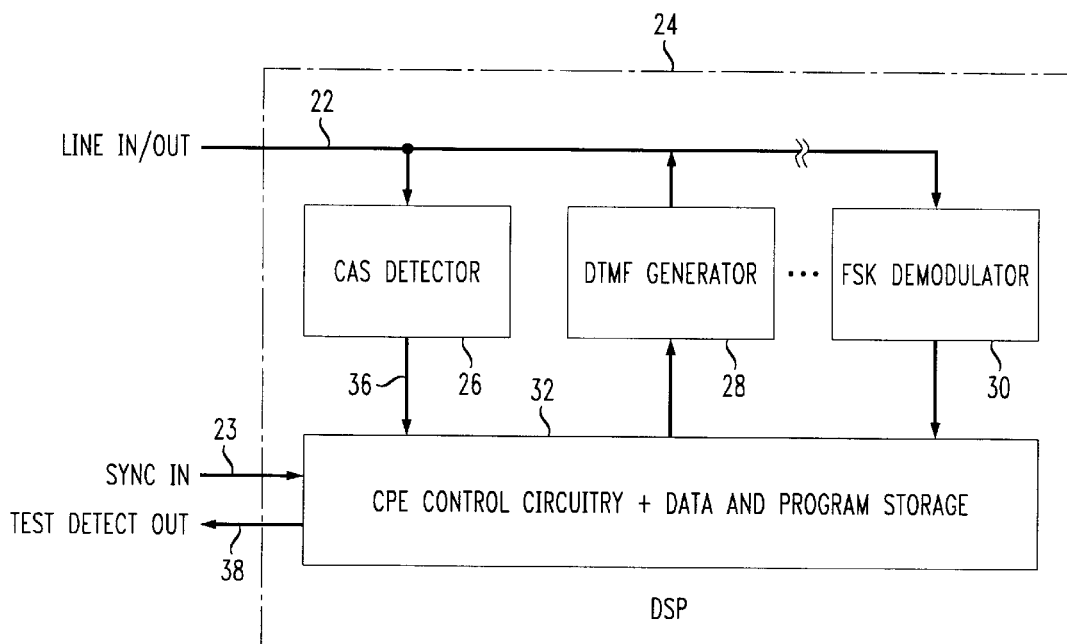
FIG. 4 is a block diagram indicating relevant areas within a DSP configured according to the present invention.

A method and apparatus for testing an alert signal detector, such as a CAS detector, according to the present invention is illustrated in FIGS. 3–5. As shown in FIG. 3, testing platform 10 is comprised of a test control unit 12, an audio source 14, and a mixer 16. The test control unit 12 generates intermittent CAS tones 18 in accordance with control software that adjusts the relevant parameters of the CAS tone, including duty cycle, pulse count, frequency, twist, level, and duration, according to the particular test sequence being executed. It will be understood that other test alert signals may be generated depending on the specific alert signal detector being tested.

In addition to generating test CAS tone 18, the test control unit 12 also outputs a SYNC signal on line 23, connected to the DSP 24. An active SYNC signal indicates when a valid CAS should be detected. In the preferred embodiment, the test control unit 12 is a LabVIEW® system having adjustable DTMF tone generating hardware and running an appropriate test program. LabVIEW is a programming language and hardware platform manufactured by National Instruments, Inc., of Austin Tex. Other systems which can controllably generate a dual tone audio output may also be used.

Audio source 14 is preferably a conventional audio tape player and provides an audio signal 20 in accordance with selected recordings of speech and music. Mixer 16 is a conventional audio mixer that combines the test CAS tone 18 and audio signal 20 to create the test signal which is input to the DSP 24 on line 22.

As illustrated in FIG. 4, DSP 24 is comprised of the CAS detector 26 and DTMF generator 28 connected to programmable control circuitry 32. The DSP 24 may also contain ao additional line I/O modules 30 such as an FSK demodulator. The DSP 24 containing the CAS detector 26 to be tested is typically formed as a single integrated circuit. However, as used herein, a DSP also encompasses distributed arrangements where the programmable control circuitry 32 is physically separate from the CAS detector 26. In operation, CAS detector 26 monitors the audio signals present on line 22. When a CAS is detected, a CAS-detect signal is sent to the control circuitry 32 via signal 36.

During the testing procedure, the DSP 24 is configured to receive the SYNC input signal on line 23 and is programmed with a CAS detector test algorithm which compares the received SYNC pulses input on line 23 with any CAS detects present on signal 36. In accordance with the present invention, when one or both of a SYNC pulse and a CAS detect is received by the control circuitry 32, the CAS detector test algorithm determines whether the CAS detector 26 has validly detected a CAS, falsely detected a CAS, or failed to detect a CAS. The results of this comparison are indicated on DSP output 38 as a Test Detect Out signal. In the preferred embodiment, output 38 is the digital data bus normally used to output received CID data. However, any available output port may be used.

The test detect out signal 38 is input to the test control unit 12 as shown in FIG. 3. The number of valid, false, and missed CAS detections are totaled and can be used to calculate talkoff and talkdown error rates. Because testing according to the present invention relies on a special SYNC signal, the results are not colored by false or missed detections of a dual tone ACK signal and therefore are significantly more reliable than those from conventional testing methods. Since the SYNC input signal 23 is used only during testing, this input may be utilized for other purposes during normal DSP operations. For example, the control circuitry 32 in DSP 24 can be temporarily configured and programmed with the CAS detector test algorithm during the test . Alternatively, the CAS detector test algorithm can be permanently stored in the control circuitry 32 and enabled when needed by, e.g., entering a test mode.

The timing relationship between an audio signal, a test CAS tone, and the SYNC pulse is illustrated in FIG. 5. As indicated, speech and/or music is continuously presented to the CAS detector 26 in DSP 24 via the mixer 16 for the defined testing interval. During this interval, test control unit 12 generates CAS tones and SYNC pulses in accordance with its control software. The control software determines the duration of the test CAS tone, $t_2$, its duty cycle $t_1/t_2$, as well as the various signal parameters, as discussed above. If a valid CAS tone has been generated, a SYNC pulse is generated having duration $t_4$ and duty cycle $t_3/t_4$, also determined by the control software. The SYNC pulse is active only during the period when a CAS detection would be valid. Thus, time period $t_3$ is greater than $t_1$ and the difference between $t_3$ and $t_1$ is the minimum period of time a CAS tone must be received before it is considered valid.

FIG. 5 also indicates what type of error is being tested for at any given time during the test procedure. During time periods $t_3$ and $t_5$ when the SYNC pulse is inactive, no valid CAS tones should be detected. Any CAS detected by CAS detector 26 during this time is an error. The CAS detector test algorithm running in the control circuitry 32 therefore indicates a talkoff error if a CAS detect is received when the SYNC signal is not active.

During time interval $t_4$, the SYNC signal is active. Interval $t_4$ indicates the window in which a valid CAS should be detected by CAS detector 26. Therefore, when the SYNC input 23 goes active, the CAS detector test algorithm waits to receive a CAS detect signal from the CAS detector 26. If a CAS detect is received during the SYNC pulse, a valid detect is indicated. If no CAS detect is received by the end of interval $t_4$, when the SYNC pulse ends, the CAS detector 26 has failed to detect the CAS signal in time and a talkdown error is indicated.

Although only a single CAS tone and SYNC pulse are illustrated in FIG. 5, a typical test run to evaluate the reliability of a CAS detector design takes several hundred hours, during which time several hundred thousand test CAS tones may be generated. The present method of testing a CAS detector advantageously allows both the talkoff and talkdown rates to be determined concurrently, thus reducing the length of time required to test a CAS detector. Furthermore, testing according to the present method gives results which do not suffer from false positives and negatives introduced by conventional methods that rely on the testing platform to detect ACK signals with its own DTMF detector. Finally, one skilled in the art would recognize that this method can be applied to test any CAS detector which is associated with a programmable DSP.

While the invention has been particularly shown and described with reference to preferred embodiments and methods thereof, it will be understood by those skilled in the art that various changes in form and details may be made therein without departing from the spirit and scope of the invention. Specifically, it will be understood that the method and apparatus of the present invention may be used to test other alert signal detectors, and is not restricted to use only with CAS detectors.

We claim:

1. A method for using a test control unit to test an alert signal detector, said testing method comprising a generating step and a detecting step;

said generating step comprising the steps of:
    producing a mixed test signal including an alert signal and an audio signal;
    sending said mixed test signal to said alert signal detector; and
    producing a SYNC pulse indicating when said alert signal should be detected by said alert signal detector;

said detecting step comprising the steps of:
    receiving said SYNC pulse;
    receiving an output signal from said alert signal detector; and
    indicating whether said alert signal detector has validly detected said alert signal.

2. The method of claim 1, wherein said indicating step further comprises the steps of indicating whether said alert signal detector has detected a false alert signal or failed to detect said alert signal.

3. The method of claim 1, wherein said generating step further comprises the steps of:
    selecting the signal parameters of said alert signal;
    selecting the duration of said SYNC pulse; and
    selecting the temporal relationship between said alert signal and said SYNC pulse.

4. The method of claim 3, wherein said selected signal parameters comprise one or more of duration, level, frequency, and twist.

5. The method of claim 2, further including the steps of:
    storing the number of indicated valid alert signal detections, false alert signal detections, and failed alert signal detections during a particular interval of time; and
    calculating talkoff and talkdown error rates according to said stored numbers and said interval of time.

6. The method of claim 1, wherein:
    said alert signal detector is a customer premises equipment alert signal detector incorporated in a digital signal processor;
    said detecting step is performed by said digital signal processor; and
    said generating step is performed by said test control unit.

7. The method of claim 6, wherein said audio signal is generated by an audio tape player.

8. Apparatus for testing an alert signal detector comprising:
    a test control unit adapted to generate a test alert signal and a SYNC signal, said SYNC signal having a fixed relationship with said alert signal which indicates when a valid alert signal should be detected;
    a mixer adapted to mix said test alert signal with an audio signal to form a mixed signal which is applied to said alert signal detector; and
    control circuitry adapted to receive said SYNC signal and an alert signal detector output and to generate an output which indicates to said test control unit whether said alert signal is detected during said SYNC signal.

9. The apparatus of claim 8, wherein:
    said test control unit comprises a computer and controllable tone generator, said computer being adapted to execute a test control program that controls the generation of said test alert signal and said SYNC signal.

10. The apparatus of claim 8, wherein said control circuitry is a digital signal processor connected to said alert signal detector and said test control unit, said digital signal processor including an alert signal detector test program.

11. The apparatus of claim 10, wherein said digital signal processor is configured with said alert signal detector test program only during testing of said alert signal detector.

12. The apparatus of claim 8, wherein said audio signal is generated by an audio tape player and an audio recording of at least one of speech and music.

13. The apparatus of claim 8, wherein said control circuitry is further adapted to generate an output which indicates to said test control unit whether said alert signal detector has detected a false detect signal or whether said alert signal has failed to detect said alert signal.

14. The apparatus of claim 8, wherein said test control unit is adapted to store test results including the number of indicated valid alert signal detections during a particular interval of time.

15. The apparatus of claim 8, wherein said alert signal detector is a customer premises equipment alert signal detector and said alert signal is a dual tone customer premises equipment alert signal.

16. A method for using a test control unit to test a customer premises equipment (CPE) alert signal detector, said testing method comprising a generating step and a detecting step;

said generating step comprising the steps of:
  intermittently producing a test CPE alert signal;
  mixing said test CPE alert signal with an audio signal from an audio source;
  sending said mixed test signal to said CPE alert signal detector; and
  sending a SYNC pulse indicating when a valid CPE alert signal should be detected by said CPE alert signal detector;
said detecting step comprising the steps of:
  generating CPE alert signal detection (CAS-detect) signals when a caller alert signal is detected by said caller alert signal detector;
  analyzing said CAS-detect signals and said SYNC pulses; and
  indicating whether said CPE alert signal detector has validly detected a CPE alert signal, falsely detected CPE alert signal, or failed to detect a CPE alert signal.

* * * * *